United States Patent [19]
Kahn

[11] 3,854,793
[45] Dec. 17, 1974

[54] LIQUID CRYSTAL CELLS
[75] Inventor: Frederic Jay Kahn, Stirling, N.J.
[73] Assignee: Bell Telephone Laboratories, Incorporated, Murray Hill, N.J.
[22] Filed: June 27, 1972
[21] Appl. No.: 266,587

[52] U.S. Cl. .................. 350/160 LC, 117/123 C
[51] Int. Cl. ............................................ G02f 1/16
[58] Field of Search.......... 350/160 LC; 117/123 C, 117/126 GS

[56] References Cited
UNITED STATES PATENTS
3,728,008  4/1973  Allan et al................... 350/160 LC Primary Examiner—Edward S. Bauer
Attorney, Agent, or Firm—R. A. Ryan

[57] ABSTRACT

A liquid crystal display cell for use in, for example, a schlieren optics projection system, constructed in accordance with the principles of the present invention, includes a pair of support substrates for supporting and containing a liquid crystal substance.

A thin layer of a silane coupling agent intermediate at least one of the substrates and the liquid crystal substance comprises an orienting medium. In particular, the silane molecules react with the substrate to form a chemical bond with the molecules of the substrate. In addition, the silane molecules interact with the liquid crystal molecules in such a manner as to cause the liquid crystal molecules to assume a preferred orientational order.

4 Claims, 2 Drawing Figures

3,854,793

LIQUID CRYSTAL CELLS

RELATED APPLICATIONS

This application is related to an application Ser. No. 266,586 by H. Melchior filed of even date herewith and assigned to the assignee of the instant application. The claims in this instant application are directed to improved display cells for use in arrangements such as those disclosed and claimed in the mentioned Melchior application.

BACKGROUND OF THE INVENTION

1. Field of the Invention

The present invention relates to improved liquid crystal display cells and, more specifically, to liquid crystal display cells including an orienting medium.

2. General Description

The existence of materials, broadly classified as liquid crystals, was observed about 100 years ago. Interest in liquid crystals had, however, been limited almost exclusively to the laboratory until recently when there arose a renewed interest in liquid crystals and their use in a variety of commercial applications. As a result of this extended interest in liquid crystals, there is a significant body of literature relating to their theory and properties. The following references are representative of that knowledge and are recommended to those desiring to become more familiar with the theory and operation of liquid crystals: Molecular Structure and the Properties of Liquid Crystals by G. W. Gray, Academic Press, N.Y. 1962; "Liquid Crystals: Perspectives, Prospects and Products" by Edwin Stepke appearing in Electro-Optic Systems Design, February 1972, pages 20–31, "Liquid Crystals and Their Applications" by J. L. Fergason et al., appearing in Electro Technology, January 1970, pages 41–50; Liquid Crystals and Their Applications, edited by Thomas Kallard, Optosonic Press N.Y. 1970. It is noted that the last-mentioned reference includes an extensive bibliography which will provide additional useful reference material.

The following brief discussion of the background of the invention, then, is not intended to be an in-depth tutorial on liquid crystals, but rather is intended to merely refresh the memory of a reader as to some very general concepts.

In general, then, a liquid crystalline material (commonly referred to as a liquid crystal) is a material which includes a liquid crystalline phase. That is, in a particular temperature range within the liquid phase, the molecules of the substance have a long-range orientational order. At temperatures below the mentioned temperature range, the substance behaves as a solid and at temperatures above this range, the substance behaves as an ordinary isotropic liquid. Within the temperature range defining the liquid crystalline phase (mesophase), however, the liquid crystal substance exhibits a number of interesting and useful properties.

To better understand these properties, it is common to consider that there are three orientational orders which the molecules of the liquid crystalline substances can assume in the liquid crystalline phase or state, viz., the nematic, smectic, and cholesteric orders. To illustrate, if the (typical) rod-like molecules of a liquid crystal substance are aligned such that their long axes are parallel to each other but the molecules are free to move in a direction parallel or perpendicular to the long axes, the liquid crystal molecules are said to have an orientational order defining the nematic phase. Different constraints on the molecules, well known to practitioners in the art, which distinguish the liquid crystal phase from the isotropic liquid phase, define the cholesteric and smectic phases.

It is a further characteristic of liquid crystal substances in their liquid crystalline states that they exhibit distinct textures. The texture which a liquid crystalline substance assumes depends on the composition of the material, and the temperature and pressure to which the material is subjected. These different textures, in addition, depend on the past history of the substance, the boundary conditions imposed on the substance and various other conditions.

Most notably, substances having a texture characterized by a uniform molecular order typically exhibit little or no light scattering. Thus, in the absence of external stimuli, uniformly ordered liquid crystals in the mesophases show little or no scattering of light.

Alternatively, however, liquid crystal materials in the liquid crystalline phase, can be altered by various means to create a texture which will result in the strong scattering of light. In general, it is this ability to controllably impose and remove these light-scattering textures which are of particular interest in the instant invention.

It is an additional feature of liquid crystal substances that the polarization of light transmitted through those substances can be altered by the application of external stimuli such as electric fields.

Both the scattering effects and the polarization effects introduced into liquid crystals are readily made visible by use of various optical arrangements (such as standard projection techniques) well known to persons well practiced in the art.

It is emphasized that the properties and characteristics of the liquid crystalline substances described herein are those exhibited by thin layers or coatings of liquid crystal substances.

It is further considered helpful at this point to mention that it is well known to the practitioner in the art to establish an ordered condition of the molecules of a liquid crystalline substance, as by applying an electric field across the thin film. Alternatively, an ordered condition can be achieved by applying a mechanical shear to the substance which affects the orientation of the molecules in the manner desired.

Disorder can be imposed in a liquid crystal by applying a conduction current to the liquid crystalline substance which current is arranged to introduce turbulence into the substance. In other instances, disorder is introduced by applying heat sufficiently high to cause the material to make the transition from the liquid crystalline state to the isotropic liquid state and then allowing the material to return to the mesophase. In this latter instance, when the substance is cooled to the liquid crystalline state, it partially retains the disturbed condition of the molecules caused by the heating effect.

In many liquid crystal materials the texture giving rise to scattering centers decays virtually spontaneously to a texture which does not scatter light. For example, in arrangements for inducing scattering centers by means of conduction-current, a phenomenon more commonly referred to as dynamic scattering, light is scattered only so long as the the flow of current is maintained. It has been found that the length of the decay interval of the scattering texture is a function of the composition of the material.

3. Prior Art

A patent to I. Haller et al., U.S. Pat. No. 3,656,838, issued Apr. 18, 1972, describes a nematic liquid crystalline substance which includes an additive material. Molecules of the additive material are adsorbed by the support substrate. The molecules thus adsorbed affect the liquid crystal molecules in such a fashion that those liquid crystal molecules align themselves with their long axes perpendicular to the face of the support substrate.

In many cases it is undesirable to add orienting materials directly to liquid crystalline substances because those additives can adversely affect the chemical, electrical, thermal and optical properties of the liquid crystal substances.

In addition it may be difficult to obtain an orienting layer of uniform and controlled thickness with an additive material which is adsorbed at the substrate surface. For example, the optimal concentration of the additive in the liquid crystal depends on cell thickness. If the concentration for a particular cell thickness is too high more than a monolayer will be adsorbed at substrate surface. If it is too low the substrate will not be completely coated with adsorbed molecules.

In addition, the uniformity of the adsorbed layer depends on the manner in which the cell is filled with the liquid crystal-additive mixture. In accordance with the arrangement of the present invention, the orienting layer is applied to a substrate surface independently of the liquid crystal substance and, hence, can be controlled to essentially assure the application to the substrate of a uniform bonding layer with controlled thickness.

It is therefore an object of the present invention to provide improved liquid crystal display cells.

Further, the additive aligning substance of the Haller et al patent is physically adsorbed by the substrate. Such physically adsorbed layers deteriorate rapidly over a period of time thereby reducing the useful life of the cell in which they are incorporated. A patent to the instant inventor, U.S. Pat. No. 3,694,053, issued Sept. 26, 1972 and assigned to the assignee of the present invention also discloses an arrangement including an orienting medium which is physically adsorbed by the substrate surface.

The cells of the present invention, on the other hand, include orienting layers which form a long-lasting chemical bond with the substrate thereby significantly improving the useful life of those cells.

It is therefore an object of the present invention to provide liquid crystal display cells having extended useful lives.

SUMMARY OF THE PRESENT INVENTION

In accordance with the principles of the present invention, a liquid crystal display cell typically includes a layer of liquid crystalline substance, two support substrates and a monolayer of silane coupling material intermediate at least one of the support substrates and the liquid crystal substance. In one instance, one end of the molecules of the monolayer of the silane coupling agent forms a chemical bond with the substrate. As a result, the molecules of the silane coupling material, in this instance, assume an orientation in which their long axes are perpendicular to the substrate. Because of intermolecular forces, the liquid crystal molecules align themselves such that their long axes are parallel with those of the silane coupling material thereby producing a cell in which the liquid crystal molecules are ordered in the specified manner.

It is therefore a feature of the present invention that liquid crystal display cells include a layer of silane coupling agent.

DETAILED DESCRIPTION

Silane coupling agents are well-known materials which are often used to provide a stable bond between dissimilar surfaces. There are a number of published books and articles describing the composition and properties of silane materials. Typical of these are: an article entitled, "Adhesion Through Silane Coupling Agents" by E. P. Plueddemann appearing in the Journal of Adhesion, Vol. 2, July 1970, page 184, and an information booklet entitled, Silane Coupling Agents, published by the Dow-Corning Corporation, 1970.

Briefly, it is an important characteristic of silane coupling agents that they form a chemical bond with certain surface materials. In particular, silane coupling agents are a chemical family of organosilicon materials. The general formula for the reactive silane molecule is: $RSiX_3$ where R is the organofunctional group attached to the silicon atom in a thermally and hydrolytically stable manner and X designates hydrolyzable groups upon silicon.

Illustratively,

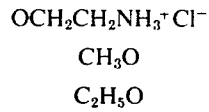

are the hydrolyzable groups of the so-called alkoxysilanes, $CH_3COO$ is the hydrolyzable group of the acetoxysilanes and Cl is the hydrolyzable group of the chlorosilanes.

Notably, silane coupling agents form bonds with a wide variety of siliceous and metal oxide materials, the most commonly used materials as liquid crystal substrates. In addition, the silanes also form bonds with photoconductors such as cadmium sulfide and zinc cadmium sulfide, as well as metals such as aluminum, also of use in liquid crystal cells.

Figure 1:
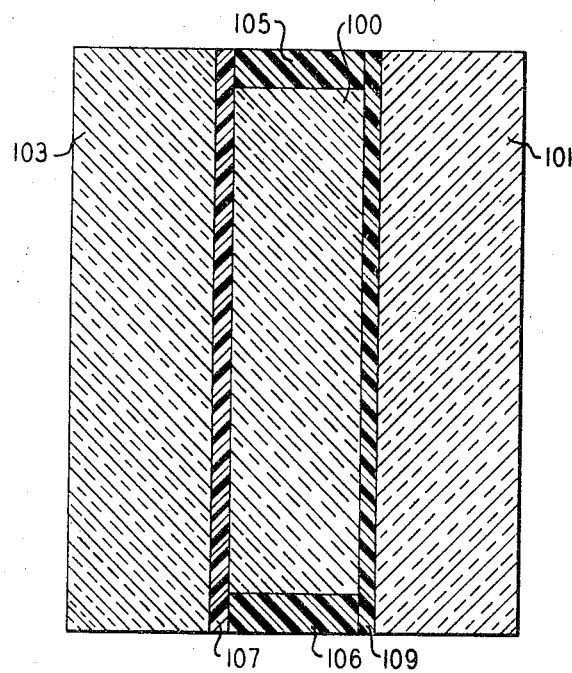
FIG. 1 shows a liquid crystal display cell in accordance with the present invention.

FIG. 1 is a cross-sectional view of a liquid crystal display cell constructed in accordance with the preferred embodiment of the present invention. In particular, a liquid crystal substance 100 which might be a nematic liquid crystal substance, such as MBBA, is contained within the cavity defined by support substrates 101, 103, and spacers 105 and 106. There is also depicted in FIG. 1 a layer of silane coupling agent 107 intermediate the substrate 103 and the liquid crystal layer 100 and a layer of silane 109 intermediate substrate 101 and liquid crystal substance 100. The silane layer, in accordance with the present invention, is typically arranged to be one molecule thick. (Of necessity, FIG. 1 is somewhat deceptive in that the silane layer appears relatively wider than it is.)

It is briefly noted that a cell, such as that shown in FIG. 1, is typically useful in a projection system such as a schlieren optics arrangement. More specifically, the texture of the layer of liquid crystal substance 100 is, in a typical arrangement, selectively altered, to form an image, and a projection light in combination with appropriate aperture and focusing apparatus used to project the image on a display screen.

The chemisorbable feature of silane coupling agents is of considerable value in constructing liquid crystal cells like that of FIG. 1 in accordance with the precepts of the present invention. In particular, the extremely durable chemical bonds extend the useful life of liquid crystal display cells considerably. The chemical bonds (in one instance, a hydrogen bond and, in another instance, a siloxane bond) result from the interaction of the hydrolyzed groups with the substrate.

Equally significant, it is a characteristic of the molecules of silane coupling agents that they include molecular chains, for example, hydrocarbon chains. Hydrocarbon chains are particularly appropriate for aligning liquid crystal substances. It is theorized that these hydrocarbon chains exert molecular forces on neighboring liquid crystal molecules which forces operate to align the long axes of the "free" liquid crystal molecules parallel with the long axes of the bonded hydrocarbon chains.

Once the layer or plane of molecules nearest the silane has been aligned, by virtue of proximity with the silane monolayer, the remaining molecules of the liquid crystal layer, in response to intermolecular forces among themselves, align themselves such that their long axes are parallel to the long axes of the neighboring aligned molecules.

Thus, if a molecular orientation in which the long axes are perpendicular to the support substrate is desired, a silane in which the hydrocarbon chains arrange themselves perpendicular to the support substrate is chosen. Typical of these silanes is N,N-dimethyl-N-octadecyl-3-aminopropyltrimethoxysilyl chloride (hereinafter referred to as Material I, for convenience).

Similarly, it may be necessary in the construction of a liquid crystal display cell to align the liquid crystal molecules such that their long axes are parallel with the surface of the support substrate. Hence, a silane is advantageously used in which the molecules have not only a chemical bonding group on one end and a molecular chain, but a physical or chemical bonding group at or near the other end thereof. This second bonding group is arranged to form, in the more typical case, a physical bond with the substrate surface. It is theorized that the hydrocarbon chain forms a flattened loop between the bonding ends of the molecules. According to this theory, then, the silane molecule including the hydrocarbon chain, or at least a significant part of it, appears to the nearby liquid crystal molecules as though it were parallel to the substrate surface. By virtue of the intermolecular forces, then, the nearby liquid crystal molecules align themselves with their long axes parallel to the long axes of the molecules of the silane material, or at least what appears to be the orientation of the long axes of the molecules of the silane material. A typical silane material, the molecules of which assume such a "parallel" orientation with respect to the substrate surface, is methylaminopropyltrimethoxysilane, hereinafter referred to as Material II, for convenience.

As described above, molecules of the coupling agent having a chemical bonding group on one end and a second bonding group at or near the other end are useful for establishing a parallel orientation of the hydrocarbon chain of the bonding substance. Silane materials which include a chemical bonding group and one or more additional bonding groups where these bonding groups are located along the hydrocarbon chain, but not necessarily at the ends of that chain, are also useful. The resulting orientation of the liquid crystal will depend, again, on whether the bonding agent appears to assume a parallel or perpendicular orientation with respect to the substrate surface.

Figure 2:
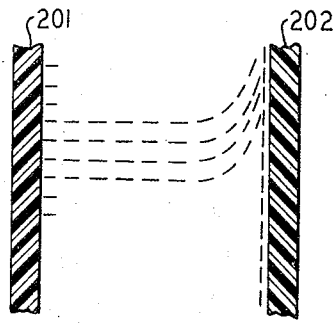
FIG. 2 illustrates the orientation of liquid crystal molecules in accordance with an alternate embodiment of the present invention.

The foregoing discussion has dealt with the alignment of the molecules of a bonding agent and, hence, a liquid crystal substance, in either a perpendicular or a parallel orientation with respect to a substrate surface. It is also useful in a number of situations to impose other, perhaps less orthodox, orientations on the liquid crystal material within the cell bounded by two substrates. In particular, it is often desirable to establish a liquid crystal orientation which varies continuously, say, from a first orientation at one substrate to a second orientation at the other substrate. For example, the molecular axes at one of the substrates might assume a perpendicular orientation in response to the influence of a coupling agent and the molecules at the second substrate might assume a parallel orientation as a result of the influence of another coupling agent. As a result of the forces exerted by the different coupling agents, the molecules of the liquid crystal layer are well ordered but vary in orientation from one substrate to the other. FIG. 2 illustrates a portion of a cell in which the long axes of the silane molecules adjacent substrate 201 are perpendicular to that substrate whereas the long axes of the silane bonded to substrate 202 are parallel to that substrate. Clearly, the molecules of a liquid crystal such as MBBA, nearest the substrate coated with, perhaps, Material I align themselves perpendicular to that substrate (201 in FIG. 2) whereas the molecules nearest the other substrate, coated with, perhaps, Material II align themselves parallel with the substrate (202 in FIG. 2). Additionally, however, the molecules between these extremes assume gradually different orientations as shown in FIG. 2.

It is also occasionally necessary to construct a liquid crystal cell in which the molecules near the surface of one or both substrates assume a disordered condition. Such an arrangement is useful, for example, in cells having a storage facility. In accordance with the principles of the present invention, then, controlled disorder, as well as controlled order, can be imposed on the liquid crystal molecules. Illustratively, a controlled disorder of the liquid crystal molecules can be achieved by applying a coating of bonding substance comprising a mixture of coupling materials such as one for producing parallel orientations and one for producing perpendicular orientations relative to a substrate. The mixture of the differently orienting coupling agents is arranged to assure that the liquid crystal molecules are influenced by both coupling agents in an essentially random fashion.

From the foregoing, it is apparent that a multiplicity of orientations can be imposed on the liquid crystal molecules by judicious choice of coupling agents.

Although it is considered well within the abilities of a practitioner in the art to construct a cell including a substrate coated with a monolayer of silane, the following procedure for achieving such a coated substrate is included for illustrative purposes.

1. Initially, one of the surfaces of the support substrate, illustratively comprising indium tin oxide, is cleaned in accordance with any one of a number of well-known procedures to remove all organic and inorganic residues.

2. The cleaned substrate is then dipped in a dilute solution of a silane material (typically a 0.1 percent solution of Material I in water) and agitated for approximately 5 minutes.

3. The substrate is withdrawn from the siloxane solution, dipped and agitated in deionized water for approximately 5 minutes to remove, or rinse the substrate of, excess silane.

4. The silane-coated substrate is removed from the deionized water and the rinsing water blown from the substrate with clean nitrogen, in well-known fashion.

5. Lastly, the silane-coated substrate is further cured in dry nitrogen, typically at 70° C. for about 1 hour to further ensure the correct degree of adhesion of the silane material to the substrate.

A monolayer of silane applied to the substrate in accordance with this procedure is essentially permanently bonded to the substrate surface. In addition, orienting portions of the silane molecules are free to align, or orient, neighboring liquid crystal molecules, in a specified direction.

In accordance with the present invention, the molecules of a liquid crystal substance are aligned such that the long axes of those molecules are essentially parallel to the hydrocarbon chains of a coupling agent. Thus, if the long axes of the molecules of the coupling agent lie in a direction parallel to a support substrate, the molecules of the liquid crystal substance align themselves such that their long axes are parallel to the substrate surface. It is often desirable, however, in such arrangements, to further orient these liquid crystal molecules such that their long axes point in a single specified direction. Thus, the surface of a substrate which has been coated with a silane is rubbed, in a typical arrangement, with lens paper. This rubbing, or, more accurately, stroking, is performed in a straight line in the preferred direction of orientation of the molecules. The molecules of the liquid crystal substance which were oriented such that their long axes are parallel to the substrate surface are, as a result of the stroking of the silane-coated substrate, oriented such that the long axes of the liquid crystal molecules are also more uniformly parallel one to the other and to the direction in which the stroking proceeds.

Thus, in accordance with the teachings of the present invention improved liquid crystals cells can be readily constructed. It is simply necessary for the practitioner to specify the liquid crystal substance to be used in the cell, the desired orientation of the molecules of the liquid crystal substance and the substrate material. (Very often the substrate, for example, float glass, includes a coating of another substance, perhaps a transparent metal oxide. In this instance, the substrate spoken of is characterized by its coating, for example, $In_{2-x}Sn_xO_{3-y}$, since this is the material to which the silane is bonded.) A silane coupling agent can then be specified which forms a bond with the substrate and which assumes the required hydrocarbon chain orientation.

It is considered appropriate at this point to include a number of illustrative liquid crystal display cell arrangements constructed in accordance with the principles of the present invention as detailed above. FIG. 1 provides the basic structural outline and Table I includes a summary of the significant features of these illustrative arrangements.

TABLE I

| Silane | Substrate | Liquid Crystal | Desired Orientation |
|---|---|---|---|
|  |  |  | (relative to substrate surface) |
| Material I | $In_{2-x}Sn_xO_{3-y}$ or Glass | MBBA* (nematic) | Perpendicular |
| Material I | $In_{2-x}Sn_xO_{3-y}$ or Glass | CBOA** (smectic) | Perpendicular |
| Material I | $In_{2-x}Sn_xO_{3-y}$ or Glass | MBBA+10% cholesteryl nonanoate (CN) CN/MBBA+CN=10% by wt. (cholesteric) | Molecular layer near surface consists essentially of perpendicularly oriented molecules; helical ordering axes are parallel to substrate. |
| Material II | $In_{2-x}Sn_xO_{3-y}$ or Glass | MBBA CBOA MBBA+10%CN | Parallel<br><br>Molecular layer near surface consists essentially of parallel oriented molecules; helical ordering axes are perpendicular to substrate. |

\* N-(p-Methoxybenzylidene)-p-n-butylaniline
\*\*N-(p-Cyanobenzylidene)-p-n-octylaniline For instance, consider the arrangement specified by the entries in row 1 of Table I. It is seen from the top row of Table I that, a glass or $In_{2-x}Sn_xO_{3-y}$ substrate (101 or 103 in FIG. 1), is specified, a nematic liquid crystal substance is to be used and their long axes are to be aligned such that they are perpendicular (normal)

to the substrate surface. Material I, as noted in Table I, exhibits the required characteristics to produce an improved display cell in accordance with the present invention.

The second row of Table I includes the specifications for a cell including a smectic liquid crystal substance. It is desired to establish an orientational order in which the long axes are normal to the substrate surface. Again, Material I is suitable for this arrangement since it bonds well with $In_{2-x}Sn_xO_{3-y}$ or glass and the long axes of its molecules assume an orientation normal to the substrate surface.

The third row of Table I specifies a cell including a cholesteric material. It is noted that the perpendicular orientational order refers to the long axes of the molecules nearest the silane. The helical configuration of cholesteric materials is such that the helical ordering axes then assume orientations parallel to the surface of the substrate in desired fashion.

Although the present invention has been disclosed in terms of an arrangement in which a monolayer of silane was preferred, a number of other arrangements within the spirit and scope of the present invention will be apparent to one skilled in the art. For example, polymeric layers other than monolayers can be formed which have an orienting effect on liquid crystal materials and which incorporate silane groups to form effective bonds with the supporting substrate. Still further, it is considered apparent to one skilled in the art that materials similar to the mentioned alkoxysilanes and chlorosilanes, for example, the silizanes having a formula $(R_1)_3SiNHSi(R_2)_3$ are suitable. A typical example of a useful silizane is one in which $R_1 = R_2 = C_{18}H_{37}$, otherwise known as octadecyldisilizane.

What is claimed is:

1. In combination
a thin film of liquid crystal material,
first and second substrates,
spacing means positioned between said substrates, said substrates and spacing means thereby defining an envelope surrounding said thin film,
a layer of bonding material chemically bonded to at least one of said substrates and positioned substantially contiguous with said thin film wherein said bonding material is N,N-dimethyl-N-octadecyl-3-aminopropyltrimethoxysilyl chloride.

2. In combination
a thin film of liquid crystal material,
first and second substrates,
spacing means positioned between said substrates, said substrates and spacing means thereby defining an envelope surrounding said thin film,
a layer of bonding material chemically bonded to at least one of said substrates and positioned substantially contiguous with said thin film wherein said bonding material is methylaminopropyltrimethoxysilane.

3. In combination
a thin film of liquid crystal material,
first and second substrates,
spacing means positioned between said substrates, said substrates and spacing means thereby defining an envelope surrounding said thin film,
a layer of N,N-dimethyl-N-octadecyl-3-aminopropyltrimethoxysilyl chloride chemically bonded to one of said substrates and positioned substantially contiguous with said thin film and a layer of methylaminopropyltrimethoxysilane chemically bonded to the other of said substrates and positioned substantially contiguous with said thin film.

4. In combination
a thin film of liquid crystal material,
first and second substrates,
spacing means positioned between said substrates, said substrates and spacing means thereby defining an envelope surrounding said thin film,
a layer of bonding material chemically bonded to at least one of said substrates and positioned substantially contiguous with said thin film wherein said bonding material is octadecyldisilizane.

* * * * *